U. S. PATENT OFFICE.

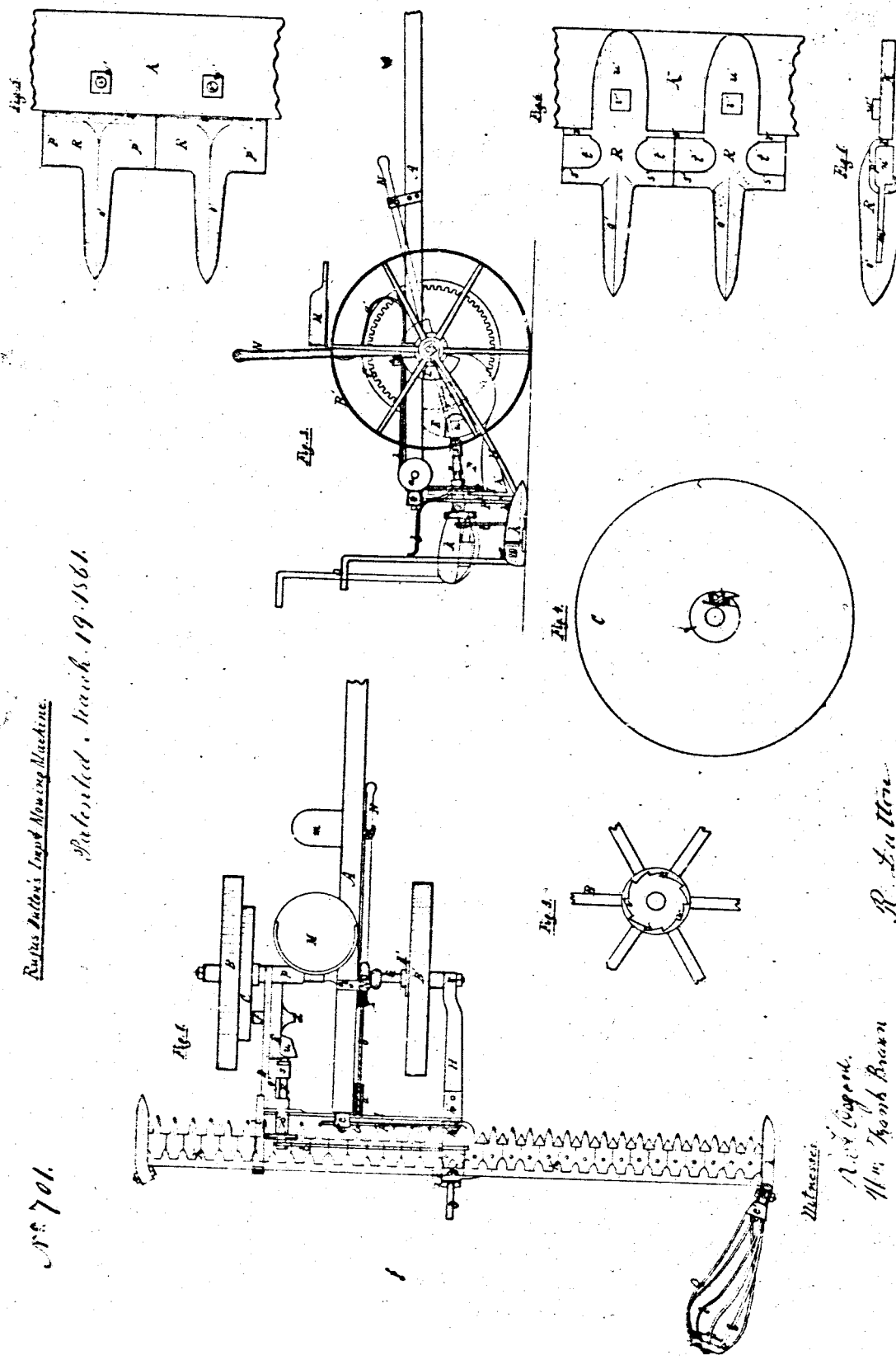

No. 701.  1861.  Whole No. 31,705.

Mowing Machines.

RUFUS DUTTON, OF DAYTON, OHIO.

Letters Patent No. 701, dated March 19, 1861.

SPECIFICATION.

TO ALL WHOM IT MAY CONCERN:

Be it known, that I, RUFUS DUTTON, of Dayton, in the county of Montgomery, and State of Ohio, have invented a new and improved Mowing Machine; and I do hereby declare, that the following is a full and exact description thereof, reference being had to the accompanying drawings making part of this specification—

Fig. 1, being a plan of the machine.

Fig. 2, a side elevation thereof.

Fig. 3, a view of a portion of the main driving wheel detached, looking on the inside, and showing the ratchet in the hub.

Fig. 4, a view of the outside of the main gear wheel detached and showing the pawl and spring by which it is coupled with the main driving wheel.

Fig. 5, a plan of a portion of the finger bar with guard fingers attached thereto.

Fig. 6, a bottom view of the same.

Fig. 7, an end view of the same.

Like letters designate corresponding parts in all the figures. In most machines heretofore used for this purpose, the construction is such that they are costly, complicated, and liable to get out of order. The object of my invention is to furnish a machine, simple in construction, easily operated, not liable to derangement, and which combines qualities best adapted for the purpose designed, and which can be furnished at less cost to the user. In the drawings A represents the tongue; M the driver's seat; B B' the driving wheels; C the main gear wheel, and G the axle on which they are mounted. The main gear wheel C, which actuates the operating parts of the machine, is situated close to, and is coupled with, the left main driving wheel as follow: on the inner face of the hub of said main driving wheel B is a concentric recess, the periphery of which is formed into ratchet teeth $v\ v\ v$, substantially as shown in fig. 3. On the centre of the outside of the main gear wheel is a concentric projection corresponding with the recess in the hub of the main driving wheel above described and fitting therein, and in the outer portion of this concentric projection is pivoted a pawl $w$, the point thereof projecting outward sufficiently to engage with the ratchet teeth $v\ v$. The point of the pawl is held in this outward position by means of a spring $z$. By this arrangement, when the machine is going forward, the main driving wheel B and gear wheel C are coupled together; but, when the machine is moved backward, said main driving and gear wheels are uncoupled.

If desirable, the pawl may be held in or disengaged from the ratchet teeth in going forward as well as backward, by any convenient device.

The driving wheel B' is in like manner provided with a ratchet recess similar to that of the main driving wheel B, in which engages the pawl of a flange $d'$, (fig. 1) rigidly secured to the axle; the arrangement of the parts forming the coupling being similar to that at the opposite end of the axle above described. It is desirable that the left or outer main driving wheel B should do most of the work in driving the sickle, thereby equalizing the draught; and for this purpose the main gear wheel together with the other gearing is placed on that side of the machine. But in turning corners, where said main driving wheel has not much motion, and frequently in passing over inequalities, where it has not much traction with the ground, it is necessary to have the opposite driving wheel B' coupled with the axle, as above described.

There are several important advantages gained by placing the main gear wheel in close proximity to the main driving wheel and coupling them together in this manner. When the gear wheel is situated near the middle of the axle, it is liable to strike obstructions in its path, but this objection is obviated in a great degree by placing it on one end. By this arrangement also the gear wheel being situated at the extremity of the axle, opposite to the finger bar, its weight which is considerable has a tendency to equalize the draught. There is also considerable saving in the cost, for where the gear wheel is situated away from the main driving wheel, a flange, similar to the flange $d'$, or its equivalent, must be used in its place, in order to couple said main driving wheel to the axle. At a suitable position inside the main gear wheel C, is secured to the axle, by means of an eye or socket $p$. (fig. 1) the outer side D of the frame of the machine and to the extremity of the axle outside of the driving wheel B' is secured the inner side H of the frame; the connection of said side H with the axle being by an eye or socket $r$, in which the axle turns. The sides D and H extend back and are connected by means of the back I of the frames, said back being sufficiently elevated to pass over the mown grass. The outer side D is a metallic plate of suitable size for the purpose designed, having cast on its outer surface at the proper position a bearing $f$ for the reception of the counter shaft $d$ of the pinion and bevel wheel, receiving their motion direct from the main gear wheel. The

*Dutton's Improvement in Mowing Machines.* bearing $f$, forming a portion of the plate D, and consequently being formed always at the proper distance from the axle of the driving wheels, keeps the pinion on the counter shaft, passing through it constantly, in the proper position to mesh with the teeth of the main gear wheel.

On the inner side of the plate is secured a casing box E, inclosing the bevel gearing, the projecting centre of said casing box forming a bearing for the inner end of the counter shaft $d$. A projection $u$, of suitable size and shape, is formed on the rear side of the casing box, to receive the bevel pinion on the end of the pitman shaft F. The bevel wheel and pinions being entirely inclosed in this casing box, are prevented from coming in contact with grass, grit, or any extraneous substance having a tendency to choke or wear them. On the rear end of the plate D is a metallic piece $g'$, having bearings $s$ $s$ for the pitman shaft F, the two sides of which are at right angles and fit to and rigidly brace the corner formed by the side D and back I of the frame. The back I is bent round and is bolted to the outer plate D and likewise to the metallic piece $g'$. The opposite or inner end of the back I is curved or turned downward on the inner side H of the frame and secured rigidly thereto, as shown at $h'$.

This back I, thus situated in front of the pitman crank, protects it from any obstruction and avoids the necessity of shielding it. The inner side H of the frame extends behind the junction of the back I therewith, and underneath the hinge pieces $i$ of the finger bar, the extremity thereof being turned up and forming a lug or ear $z'$, to which the similar adjacent lug or ear $k'$ of said hinge piece is jointed by means of a pivot $q$. The lug $k'$ on the opposite end of the hinge piece $i$, is in like manner jointed by means of a pivot $h$ to the back I of the frame.

These two pivots are on a line with each other so that the finger bar $k$ is easily folded over on the rear end of the frame, whenever it is desirable. For sustaining it, when thus folded over, a support $l$ may be used, extending back from the outer plate D, to which it is bolted, substantially as represented. By this arrangement of the inner side piece H, forming the shoe of the finger bar, and resting on the ground, and of hinging the finger bar so as to allow its outer end to rise and fall, said finger can adapt itself to the inequalities of the ground in mowing.

The finger bar is raised, lowered, and controlled by the operator, when sitting in the driver's seat, by means of the following arrangement, On the axle G, at a suitable position near the driver's seat, is secured a grooved segment L, turning on said axle and having a socket into which fits the end of a lever or handle N, extending upward so as to be conveniently operated by the driver. In the upper portion of the groove of this segment is attached the end of a cord or chain $b$, passing backward over a pulley $a$, secured to the tongue A, and extending thence downward and fastened to the back I of the frame by an eye bolt $l'$, substantially as represented. By this arrangement, when the handle N is thrown forward and the finger bar folded over, as shown by red lines in figs. 1 & 2, the rear end of the frame including the finger bar is raised sufficiently from the ground to allow the machine to be transported from place to place. To hold the lever N in position, when thus thrown forward, I usually employ a hook n, secured to the tongue, and in order to catch the lever under the hook, and to detach it therefrom, the segment L is allowed a little lateral movement. At a proper position on the tongue I also secure a stop o, for the purpose of preventing the lever N from falling over, when it is in an upright position.

If the finger bar were extended as when in operation, and the rear end of the frame were raised, as described above, by means of the lever segment and cord or chain, it is apparent, (the finger bar being hinged at $g$ and $h$,) that the outer end of said finger bar would not be raised, but would still rest on the ground, while the draught shoe H would be elevated. In order to raise the outer end of the finger bar at the same time that the draft shoe is raised, and also to raise it still higher than said draught shoe, when necessary, I employ the following arrangement: On the pivot $h$ of the hinge piece $i$, is situated the end of a lever P, said lever being allowed to turn freely over toward the finger bar, but being prevented from turning independently in the opposite direction by striking the hinge piece $i$. This lever is bent upward to give it sufficient elevation, and is then turned inward, extending somewhat beyond the end of the tongue A, as represented in fig 1. On the rear end of the tongue, directly over this lever, is situated a horizontal friction roller $c$, or its equivalent, against which, when the rear end of the frame is raised, said lever strikes and causes the hinge piece $i$ to be turned inward, thereby elevating the outer end of the finger bar. Thus the finger bar is raised, lowered, and controlled by the driver without trouble. When the finger bar is turned over behind the machine, the hinge piece $i$ is reversed, and the lever P having no bearing thereon drops down and rests on the end of the eye bolt $l'$ of the back I.

In order to allow the operator to walk behind the machine, whenever desirable, and at the same time to have perfect control of the finger bar, an upright handle O, (figs 1 & 2,) of sufficient height for the purpose designed, is secured in any convenient manner to the rear end of the draught shoe H. In raising this handle, the outer end of the finger bar is elevated by means of the bent lever P and friction roller $c$, in the same manner as by operating the handle N of the segment L, as above described, and the effect is the same. To throw the mown grass away from the standing grass, as the machine passes along, I employ a track clearer Q, arranged at an acute angle with the finger bar, as represented. This track clearer is of conical form, the apex being situated toward the finger bar, and the body thereof is made of metallic wires or rods usually about one-fourth of an inch thick, arranged in a spiral manner. The ends of these wires or rods, next the finger bar, are inserted in a conical block $c'$, which turns on the bolt of a hinge socket $d'$, pointed to the rear of the outer shoe $k$ of the finger bar, and the opposite ends of said wires or rods are secured between two weight clamps $b'$ $b'$, which are provided with grooves to receive them. The weight clamps are secured firmly together by means of a bolt and nut, and they are made of such weight as to give the body of the track clearer sufficient traction with the ground to cause it to rotate. Thus arranged, the hinged socket $d'$ allows the track clearer to adapt itself to the inequali-

Dutton's Improvement in Mowing Machines.

ties of the ground, and the body of the track clearer, being composed of spiral wires or rods, and situated at an acute angle with the finger bar, receives a rotary motion by being drawn along. The cut grass passing over the finger bar falling on said track clearer, is thrown away from the standing grass in an effective manner. This arrangement is very simple, cheap, and is superior to any thing of the kind heretofore used; the spiral rods in connection with the clamp weights giving it a more effective and steady rotary motion.

My improved guard finger R is made in a single piece of such shape as to allow of the best action of the sickle bar working therein, to attach strongly and firmly to the finger bar to avoid clogging or choking; and at the same time to give the greatest amount of strength with the least amount of metal. The slot $m'$ and passage $n'$, for the reception respectively of the sickle and sickle bar, are substantially of the form shown in the end view, fig. 7, the passage $n'$ being of such size as to leave sufficient space over the top and at the back of the sickle bar, when working therein, to allow the free escape of grass and other matter that enters. The finger $o'$ is of the usual shape: but the rear upper portions $p' p'$ of the guard extend outward laterally a sufficient distance from the finger to meet the similar adjacent portions of the contiguous guard fingers; thereby forming a complete surface and a covering for the sickle bar. The rear edge of the guard turns over at right angles, as shown at $r'$, figs. 6 & 7, thereby forming a plane bearing surface against the finger bar K, and extending the whole width of the guard. The front portions $s' s'$ of the guard below the sickle slot, and corresponding with the front edge of the portions $p' p'$ above, extend likewise outward from the finger an equal distance with said portions $p' p'$, and serve as a shield to protect the sickle bar. A portion $t'$, under the sickle bar, on each side of the finger guard, is cut away, as shown in the bottom view, fig. 6, for the purpose of allowing the free escape of the grass or other substance tending to clog the sickle. The rear bottom portion $u'$ of the guard, substantially of the form shown in figs. 6 & 7, extends back nearly or quite to the rear edge of the finger bar, and forms a bearing surface against the bottom of said finger bar, to which it is secured by means of a bolt $v'$, on the upper end of which screws a nut $w'$. The upper surface $p' p'$ of the guard entirely covering the sickle bar, prevents the cut grass or any other substance from coming in contact therewith, and being drawn under the fingers and causing it to choke or clog. The rear upper portion of the guard, being raised higher than the finger bar and the nuts $w' w'$, prevents the said finger bar and nuts from obstructing the mown grass in its passage over them.

The portion $r'$, by forming a plane bearing surface its entire length against the edge of the finger bar, prevents any lateral movement of the finger, and makes necessary but a single small bolt $v'$ to hold the guard finger firmly in its place. The guard finger is much stronger than the ordinary open guard finger, and its under side may be made lighter, the upper portion $p' p'$ having a large surface and extending round as shown at $r'$, and forming a portion of the guard as a whole, thereby bracing and sustaining it against all lateral strain.

*Dutton's Improvement in Mowing Machines.*

What I claim as my invention, and desire to secure by Letters Patent, is—

The casing box E, its projecting centre forming a bearing for the end of the counter shaft, and having a projection $u'$ for the reception of the bevel pinion of the pitman shaft, in combination with the outer side plate D, provided with bearing $f$, substantially as herein described.

I also claim raising the outer end of the finger bar, at the same time, that the draught shoe is raised by means of the bent lever P, resting on the hinge piece $i$, and coming in contact with the friction roller $c$, or its equivalent, on the projecting end of the tongue, substantially as herein set forth.

I also claim the conical skeleton track clearer Q, formed of spiral rods or wires, when connected at their outer ends by the weight clamps $b'\ b'$, substantially as described.

I do not claim forming a guard finger in a single piece, nor do I claim forming it in such a manner as to cover the sickle bar and leave openings in its under side for the escape of grass and other substance, as I am aware that such a device has been known; but,

I claim the guard finger R, made in a single connected piece, covering the sickle bar, and having openings $t'\ t'$ in the bottom thereof, for the escape of grass, or other substance, entering with the sickle, when said guard finger is provided with a bearing surface $r'$, connecting the upper and lower portions of said guard finger, and resting against the edge of the finger bar, and is braced and sustained against lateral strain, as herein set forth.

R. DUTTON.

Witnesses:
R. F. OSGOOD,
WM. FRANK BROWN.